US011694846B2

(12) United States Patent
Oh et al.

(10) Patent No.: US 11,694,846 B2
(45) Date of Patent: Jul. 4, 2023

(54) MULTILAYER CERAMIC ELECTRONIC COMPONENT

(71) Applicant: SAMSUNG ELECTRO-MECHANICS CO., LTD., Suwon-si (KR)

(72) Inventors: Young Joon Oh, Suwon-si (KR); Yun Jeong Cha, Suwon-si (KR); Hyo Min Kang, Suwon-si (KR); Jun Oh Kim, Suwon-si (KR); Ji Eun Oh, Suwon-si (KR); Jeong Ryeol Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 130 days.

(21) Appl. No.: 17/403,185

(22) Filed: Aug. 16, 2021

(65) Prior Publication Data
US 2022/0148809 A1     May 12, 2022

(30) Foreign Application Priority Data

Nov. 10, 2020   (KR) .................. 10-2020-0149515
Jun. 11, 2021   (KR) .................. 10-2021-0075922

(51) Int. Cl.
  *H01G 4/30*     (2006.01)
  *H01G 4/008*    (2006.01)
  *H01G 4/012*    (2006.01)

(52) U.S. Cl.
  CPC ............... *H01G 4/30* (2013.01); *H01G 4/008* (2013.01); *H01G 4/012* (2013.01)

(58) Field of Classification Search
  CPC ........ H01G 4/30; H01G 4/012; H01G 4/1227; H01G 4/2325; H01G 4/008
  See application file for complete search history.

(56) References Cited

U.S. PATENT DOCUMENTS

| 2007/0098991 | A1  | 5/2007 | Lee et al. | |
| 2013/0038983 | A1* | 2/2013 | Kim ........................ | H01G 4/30 977/932 |
| 2014/0049877 | A1* | 2/2014 | Suzuki .................. | B82Y 30/00 29/25.42 |

(Continued)

FOREIGN PATENT DOCUMENTS

| EP | 0925860 A2 | 6/1999 |
| JP | H11-189802 A | 7/1999 |

(Continued)

*Primary Examiner* — Michael P McFadden
(74) *Attorney, Agent, or Firm* — Morgan, Lewis & Bockius LLP

(57) ABSTRACT

A multilayer ceramic electronic component includes: a ceramic body including dielectric layers and first and second internal electrodes alternately stacked with respective dielectric layers interposed therebetween; and a first external electrode connected to the first internal electrodes and a second external electrode connected to the second internal electrodes, wherein the dielectric layer includes silicon (Si), each of the first and second internal electrodes includes Si and a conductive metal, and a ratio (B/A) of an average content (B) (wt %) of Si included in each of the first and second internal electrodes to an average content (A) (wt %) of Si included in the dielectric layer is 0.99 or more and 1.41 or less.

18 Claims, 6 Drawing Sheets

(56) References Cited

U.S. PATENT DOCUMENTS

| | | | | |
|---|---|---|---|---|
| 2014/0177133 A1* | 6/2014 | Lee | ............... | H01G 4/1209 |
| | | | | 361/321.4 |
| 2016/0042866 A1* | 2/2016 | Yao | ............... | H01G 4/0085 |
| | | | | 361/301.4 |
| 2019/0051460 A1* | 2/2019 | Kawamura | ............... | H01G 4/30 |
| 2020/0258684 A1* | 8/2020 | Yun | ............... | H01G 4/228 |
| 2021/0202180 A1* | 7/2021 | Fukunaga | ............... | H01G 4/012 |

FOREIGN PATENT DOCUMENTS

| | | | |
|---|---|---|---|
| JP | 2004-342744 A | 12/2004 | |
| KR | 10-2007-0047044 A | 5/2007 | |

* cited by examiner

MULTILAYER CERAMIC ELECTRONIC COMPONENT

CROSS-REFERENCE TO RELATED APPLICATION(S)

This application claims benefit of priority to Korean Patent Application No. 10-2020-0149515 filed on Nov. 10, 2020 and Korean Patent Application No. 10-2021-0075922 filed on Jun. 11, 2021 in the Korean Intellectual Property Office, the disclosure of which is incorporated herein by reference in its entirety.

BACKGROUND

1. Field

The present disclosure relates to a multilayer ceramic electronic component.

2. Description of Related Art

In accordance with the recent trend for the miniaturization of electronic products, multilayer ceramic electronic components have also been required to be miniaturized and to have high capacitance. In accordance with a demand for the miniaturization and the high capacitance of the multilayer ceramic electronic component, an internal electrode of the multilayer ceramic electronic component has also been thinned.

Such an internal electrode includes a conductive metal, but the conductive metal constituting the internal electrode and a dielectric layer have a difference in shrinkage behavior therebetween at the time of being sintered. The difference in shrinkage behavior between the internal electrode and the dielectric layer generates stress between the internal electrode and the dielectric layer, such that connectivity of the internal electrode is decreased. In particular, when the thinned internal electrode is used, such a problem cannot but be intensified.

In order to alleviate such a problem, a method of adding a ceramic common material to an internal electrode paste to delay a shrinkage initiation temperature of the internal electrode has been used. However, the method of adding the ceramic common material has an effect of delaying shrinkage by the ceramic common material remaining in the internal electrode until secondary plasticization, but may be a problem in that a compactness of the internal electrode decreases because ceramic common material components are pushed out to the dielectric layer after 700° C. In addition, a problem that the ceramic common material components form dielectric grains to significantly decrease reliability may occur.

SUMMARY

An aspect of the present disclosure may provide a multilayer ceramic electronic component in which electrode connectivity may be improved.

Another aspect of the present disclosure may provide a multilayer ceramic electronic component having an increased capacitance at the same size.

Another aspect of the present disclosure may provide a multilayer ceramic electronic component having excellent electrical characteristics.

Another aspect of the present disclosure may provide a multilayer ceramic electronic component in which moisture resistance reliability may be improved.

According to an aspect of the present disclosure, a multilayer ceramic electronic component may include: a ceramic body including dielectric layers and first and second internal electrodes alternately stacked with respective dielectric layers interposed therebetween; and a first external electrode connected to the first internal electrodes and a second external electrode connected to the second internal electrodes, wherein the dielectric layer includes silicon (Si), each of the first and second internal electrodes includes Si and a conductive metal, and a ratio (B/A) of an average content (B) (wt %) of Si included in each of the first and second internal electrodes to an average content (A) (wt %) of Si included in the dielectric layer is 0.99 or more and 1.41 or less.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
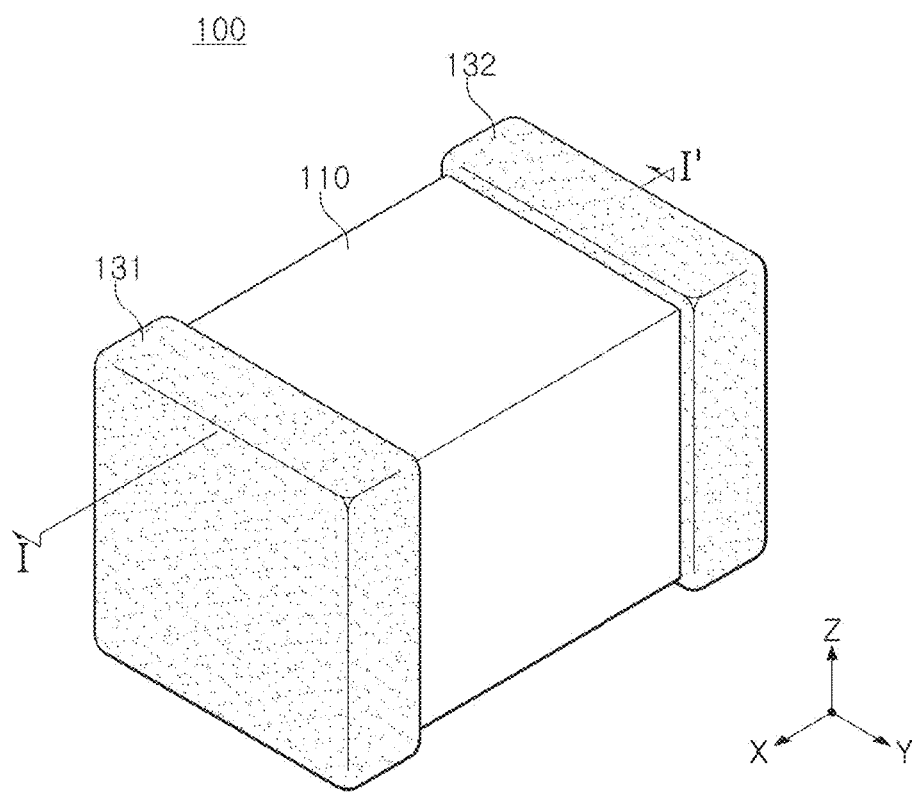
FIG. 1 is a schematic perspective view illustrating a multilayer ceramic electronic component according to an exemplary embodiment in the present disclosure.

Hereinafter, exemplary embodiments of the present disclosure will be described in detail with reference to the accompanying drawings.

In the drawings, an X direction refers to a first direction, an L direction, or a length direction, a Y direction refers to a second direction, a W direction, or a width direction, and a Z direction refers to a third direction, a T direction, or a thickness direction.

Figure 2:
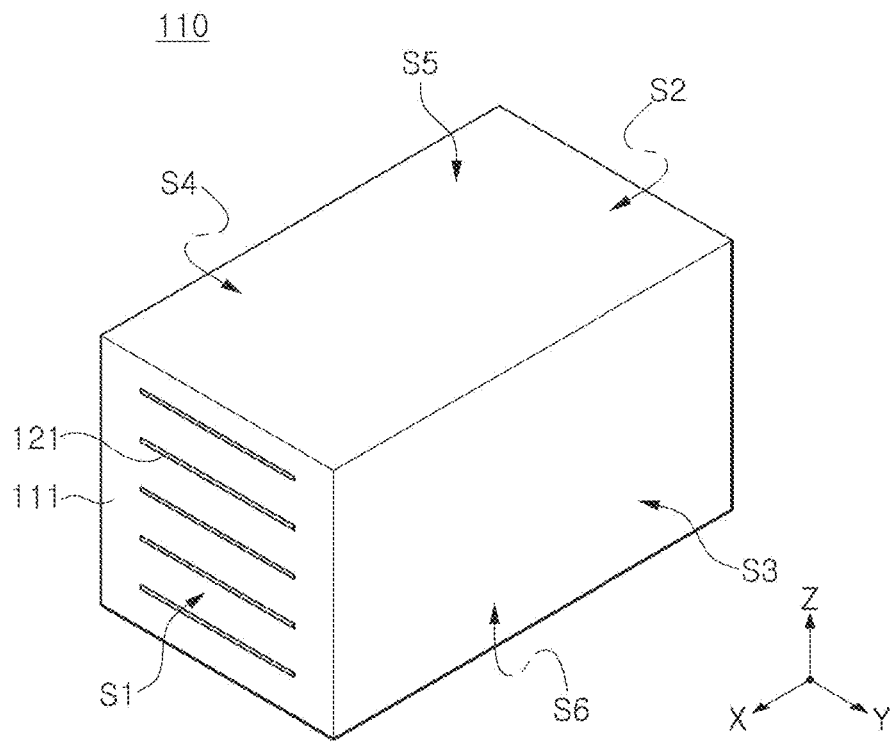
FIG. 2 is a schematic perspective view illustrating a ceramic body of FIG. 1.
Figure 3:
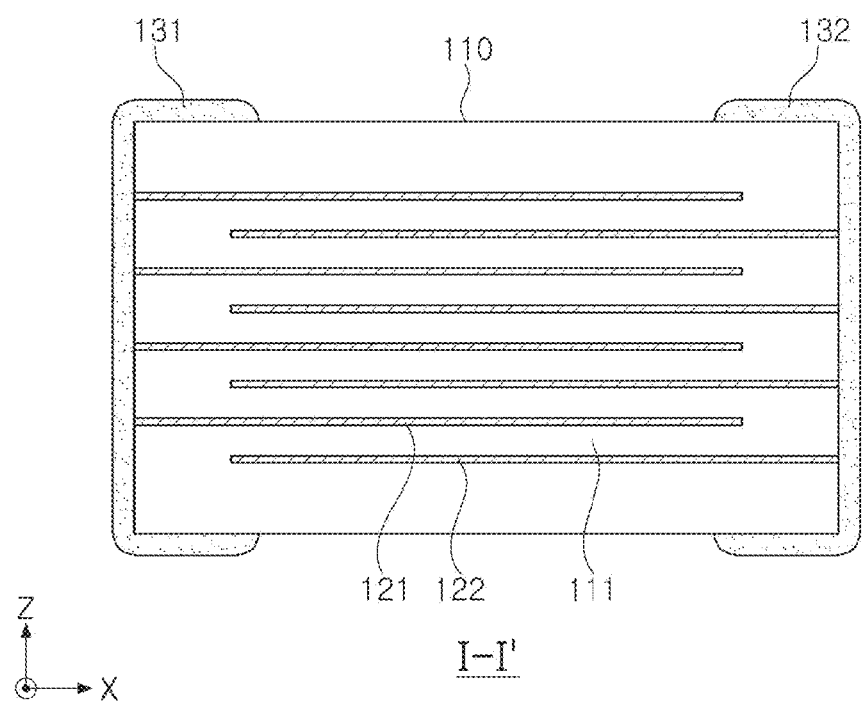
FIG. 3 is a cross-sectional view taken along line I-I' of FIG. 1.

FIG. 1 is a schematic perspective view illustrating a multilayer ceramic electronic component according to an exemplary embodiment in the present disclosure, FIG. 2 is a perspective view illustrating a ceramic body of the multilayer ceramic electronic component, and FIG. 3 is a cross-sectional view taken along line I-I' of FIG. 1.

Hereinafter, a multilayer ceramic electronic component according to an exemplary embodiment in the present disclosure will be described in detail with reference to FIGS. 1 through 3.

FIG. 1 is a schematic perspective view illustrating a multilayer ceramic electronic component according to an exemplary embodiment in the present disclosure, FIG. 2 is a schematic perspective view illustrating a ceramic body of FIG. 1, and FIG. 3 is a cross-sectional view taken along line I-I' of FIG. 1. Referring to FIGS. 1 through 3, the multilayer ceramic electronic component 100 according to the exemplary embodiment in the present disclosure may include a ceramic body 110 including dielectric layers 111 and first and second internal electrodes 121 and 122 alternately stacked with respective dielectric layers 111 interposed therebetween; and a first external electrode 131 connected to the first internal electrodes 121 and a second external electrode 132 connected to the second internal electrodes 122.

In this case, the dielectric layer 111 may include silicon (Si), each of the first and second internal electrodes 121 and 122 may include Si and a conductive metal, and a ratio (B/A) of an average content (B) (wt %) of Si included in each of the first and second internal electrodes 121 and 122 to an average content (A) (wt %) of Si included in the dielectric layer 111 may be 0.99 or more and 1.41 or less. In the present specification, the "average content (wt %)" of Si in the dielectric layer and/or the internal electrode may refer to an average value of samples taken at any five spots of the dielectric layer and/or the internal electrode. In addition, Si of the dielectric layer and/or the internal electrode may be samples taken from central portions of the dielectric layer and/or the internal electrode after cutting the ceramic body in a direction perpendicular to the length direction at any five spots, and the central portions may refer to central regions in the thickness direction and the width direction. In the multilayer ceramic electronic component 100 according to the present disclosure, connectivity of the first and second internal electrodes may be improved by adjusting the ratio (B/A) of the average content (B) (wt %) of Si included in each of the first and second internal electrodes 121 and 122 to the average content (A) (wt %) of Si included in the dielectric layer 111. Therefore, capacitance of the multilayer ceramic electronic component may be significantly increased.

In the exemplary embodiment in the present disclosure, the ratio (B/A) of the content (B) (wt %) of Si included in each of the first and second internal electrodes to the content (A) (wt %) of Si included in the dielectric layer may be 0.99 or more and 1.41 or less. The ratio (B/A) may be 0.99 or more, 1.01 or more, 1.03 or more, or 1.05 or more, and may be 1.41 or less, 1.40 or less, 1.39 or less, or 1.38 or less. When the ratio (B/A) of the content (B) (wt %) of Si included in each of the first and second internal electrodes to the content (A) (wt %) of Si included in the dielectric layer is in the range described above, excellent internal electrode connectivity may be secured.

The ceramic body 110 of the multilayer ceramic electronic component 100 according to the present disclosure may include the dielectric layers 111 and the first and second internal electrodes 121 and 122 disposed to be stacked in the third direction (Z direction) with respective dielectric layers 111 interposed therebetween.

A shape of the ceramic body 110 is not particularly limited, but may be a hexahedral shape or a shape similar to the hexahedral shape, as illustrated. Although the ceramic body 110 does not have a hexahedral shape having perfectly straight lines due to shrinkage of ceramic powder particles included in the ceramic body 110 in a sintering process, the ceramic body 110 may have substantially the hexahedral shape. The ceramic body 110 may be subjected to round treatment so that edges thereof are not angulate, if necessary. The round treatment may be, for example, barrel polishing or the like, but is not limited thereto.

The dielectric layers 111, the first internal electrodes 121, and the second internal electrodes 122 may be alternately stacked in the ceramic body 110. The dielectric layers 111, the first internal electrodes 121, and the second internal electrodes 122 may be stacked in the third direction (Z direction). The plurality of dielectric layers 111 may be in a sintered state, and adjacent dielectric layers 111 may be integrated with each other so that boundaries therebetween are not readily apparent without using a scanning electron microscope (SEM).

According to the exemplary embodiment in the present disclosure, the dielectric layer 111 may include a main component represented by $(Ba_{1-x}Ca_x)(Ti_{1-y}(Zr, Sn, Hf)_y)O_3$ (here, $0 \leq x \leq 1$ and $0 \leq y \leq 0.5$). The main component may be, for example, a compound in which Ca, Zr, Sn, and/or Hf are partially dissolved in $BaTiO_3$. In the above composition formula, x may be in the range of 0 or more and 1 or less, and y may be in the range of 0 or more and 0.5 or less, but is not limited thereto. For example, when x is 0, and y is 0 in the above composition formula, a main component may be $BaTiO_3$. In addition, various ceramic additives, organic solvents, plasticizers, binders, dispersants, and the like, may be added to the main component according to an object of the present disclosure.

According to the exemplary embodiment in the present disclosure, the dielectric layer 111 may include a Si element as an accessory component. The Si element may be injected in a form of carbonate, oxide, and/or glass of a Si element in a raw material stage, but may be included in the dielectric layer in a form of oxide and/or glass after being subjected to a sintering process. The Si components may be mainly distributed at grain boundaries, and may have a high work function to serve to increase resistance of the grain boundaries. Therefore, the multilayer ceramic electronic component having excellent reliability may be implemented.

The dielectric layer of the multilayer ceramic electronic component according to the present disclosure may include an accessory component including Si in the range of 2.2 mole parts or more and 5.5 mole parts or less based on 100 mol of the main component. A content (wt %) of the accessory component including Si may be a value measured by the same method as a method of measuring the average content (wt %) described above. The content (wt %) of the accessory component including Si may be in the range described above, such that reliability of the multilayer ceramic electronic component according to the present disclosure may be improved.

In the exemplary embodiment in the present disclosure, the average content (wt %) of Si included in the dielectric layer 111 of the multilayer ceramic electronic component may be in the range of 0.08 wt % or more and 5.5 wt % or less. The average content (wt %) of Si included in the dielectric layer 111 may be a value based on total components of the dielectric layer 111 included in the multilayer ceramic electronic component, and may refer to, for example, an average content (wt %) of Si based on a total content of the main component and the accessory component. When the content of Si included in the dielectric layer 111 is less than 0.08 wt %, a grain boundary resistance improvement effect may not be sufficient, such that a dielectric constant and a high-temperature withstand voltage may be decreased, and when the content of Si included in the dielectric layer 111 exceeds 5.5 wt %, a problem such as a decrease in sinterability and compactness and generation of a secondary phase may occur.

The dielectric layers 111 may be formed by adding an additive as necessary to slurry including the material described above and applying and then drying the slurry to carrier films to prepare a plurality of ceramic sheets. The ceramic sheets may be formed by manufacturing the slurry in a sheet shape having a thickness of several micrometers by a doctor blade method, but are not limited thereto.

The ceramic body 110 may be formed by alternately stacking ceramic green sheets on which the first internal electrodes 121 are printed and ceramic green sheets on which the second internal electrodes 122 are printed, on the dielectric layers 111 in the third direction (Z direction). A method of printing the first and second internal electrodes may be a screen printing method, a gravure printing method or the like, but is not limited thereto.

The first and second internal electrodes 121 and 122 may be stacked so that end surfaces thereof are exposed, respectively, to opposite portions of the ceramic body 110 opposing each other. Specifically, the first and second internal electrodes 121 and 122 may be exposed to opposite surfaces of the ceramic body 110 in the first direction (X direction), respectively, the first internal electrodes 121 may be exposed to a first surface S1 of the ceramic body 110, and the second internal electrodes 122 may be exposed to a second surface S2 of the ceramic body 110.

The first and second internal electrodes 121 and 122 may include a conductive metal. The conductive metal may include one or more of, for example, silver (Ag), nickel (Ni), copper (Cu), tin (Sn), palladium (Pd), platinum (Pt), iron (Fe), gold (Au), silver (Ag), tungsten (W), titanium (Ti), lead (Pb), or alloys thereof. The first and second internal electrodes 121 and 122 may be formed using a conductive paste including the conductive metal.

The conductive paste may include a ceramic common material. In the present specification, the "common material" may refer to a ceramic material for delaying shrinkage of a conductive powder particle for an internal electrode. The common material may include the same component as the main component included in the dielectric layer, and may include, for example, barium titanate ($BaTiO_3$), but is not limited thereto.

In the exemplary embodiment in the present disclosure, the first and second internal electrodes of the multilayer ceramic electronic component may include silicon (Si). The silicon (Si) may delay sintering shrinkage of the internal electrode at the time of forming the internal electrode to improve electrode connectivity.

In the exemplary embodiment in the present disclosure, the average content of Si included in each of the first and second internal electrodes of the multilayer ceramic electronic component may be in the range of 0.08 wt % or more and 2.60 wt % or less based on a total weight of the components included in the first and second internal electrodes. The average content (wt %) of Si included in each of the first and second internal electrodes may be a value based on total components of the internal electrode included in the multilayer ceramic electronic component, and may refer to, for example, an average content (wt %) of Si based on a total content of the conductive metal, the ceramic common material, and Si. When the average content (wt %) of Si included in the internal electrode of the multilayer ceramic electronic component according to the present disclosure is less than 0.08 wt %, a shrinkage delay effect of the internal electrode may not be sufficient, such that electrode connectivity improvement may be insufficient. In addition, when the average content (wt %) of Si included in the internal electrode exceeds 2.60 wt %, the internal electrode may be excessively sintered, such that reliability of an insulation resistance value or the like may be decreased.

According to the exemplary embodiment in the present disclosure, each of the first and second internal electrodes of the multilayer ceramic electronic component may include crystal grains of the conductive metal and grain boundaries disposed between two or more grains. The conductive metal may be one or more of the conductive metals described above, but is not limited thereto. The crystal grains of the conductive metal may have sizes that are not excessively large in order to suppress the ceramic common material included in the internal electrode from escaping from the internal electrode, but may be appropriately selected within a range for implementing intended electrical characteristics such as a withstand voltage.

In the exemplary embodiment in the present disclosure, a coating layer having a thickness in the range of 0.5 nm or more and 5.0 nm or less may be disposed on each of surfaces of the crystal grains of the conductive metal included in each of the first and second internal electrodes. The thickness of the coating layer may be 0.5 nm or more, 0.6 nm or more, 0.7 nm or more, 0.8 nm or more, 0.9 nm or more, or 1.0 nm or more, and may be 5.0 nm or less, 4.9 nm or less, 4.8 nm or less, 4.7 nm or less, 4.6 nm or less, or 4.5 nm or less. A method of measurement of the thickness of the coating layer includes, but not limited to, a method XXX. Other methods of measurement of the thickness of the second metal layer includes method XXX, which is appreciated by the one skilled in the art.

The coating layer may function to induce uniform dispersion of conductive metal particles included in the internal electrode to suppress a lumping phenomenon and/or a disconnection phenomenon of the internal electrode. The coating layer may be added as a separate component to the paste for forming an internal electrode, but may be formed using conductive metal powder particles having surfaces on which a component forming a coating layer is disposed, in order to induce uniform dispersion of the conductive metal powder particles in the internal electrode and suppress the common material from escaping form the internal electrode in a sintering process.

In the exemplary embodiment in the present disclosure, the coating layer of the conductive metal included in each of the first and second internal electrodes may include Si. When the coating layer of the conductive metal included in each of the first and second internal electrodes includes Si, a Si component on a surface of the conductive metal may help to disperse the common materials included in each of the first and second internal electrodes. Therefore, in the internal electrode of the multilayer ceramic electronic component according to the present disclosure, extrusion of the common material may be suppressed and a shrinkage delay effect may be excellent.

In the exemplary embodiment in the present disclosure, Si included in each of the first and second internal electrodes of the multilayer ceramic electronic component may be disposed on the surface of the crystal grain of the conductive metal. In this case, Si may be uniformly distributed on the surfaces of the crystal grain formed by the conductive metal. Since Si is disposed on the surface of the crystal grain, contact points between metals may be reduced in a process of sintering the conductive metal to improve a shrinkage delay effect.

Si may be included in a form of oxide in each of the first and second internal electrodes of the multilayer ceramic electronic component according to the present disclosure. Si may be injected in a form of carbonate and/or glass of a Si element in a raw material stage and may be bonded to the conductive metal through a separate coupling agent, but may be included in each of the first and second internal electrodes in a form of oxide after being subjected to a sintering process.

In the multilayer ceramic electronic component according to the present disclosure, a method of disposing Si included in each of the first and second internal electrodes on the surface of the coating layer of the conductive metal or the crystal grain is not particularly limited as long as the content of Si is in the content range described above. Si may be in a state in which it is previously coated on the surface of the conductive powder particle for forming an internal electrode, and, for example, $SiO_2$ may be coated on the surface of the conductive metal through a silane coupling agent, but is not limited thereto.

In the multilayer ceramic electronic component according to the present disclosure, the first external electrode 131 and the second external electrode 132 may be disposed on opposite surfaces of the ceramic body in the first direction (X direction), respectively. The first external electrode 131 may be connected to the first internal electrodes 121, and the second external electrode 132 may be connected to the second internal electrodes 122. The first external electrode 131 may be disposed on the first surface S1 of the ceramic body 110, and the second external electrode 132 may be disposed on the second surface S2 of the ceramic body 110.

In the exemplary embodiment in the present disclosure, each of the first external electrode 131 and the second external electrode 132 of the multilayer ceramic electronic component may include a conductive metal and a glass component. The conductive metal may include one or more of, for example, copper (Cu), nickel (Ni), tin (Sn), palladium (Pd), platinum (Pt), gold (Au), silver (Ag), tungsten (W), titanium (Ti), lead (Pb), or alloys thereof.

The glass component included in each of the first external electrode 131 and the second external electrode 132 may be a composition in which oxides are mixed with each other, and may include one or more selected from the group consisting of silicon oxide, boron oxide, aluminum oxide, transition metal oxide, alkali metal oxide, and alkaline earth metal oxide, but is not particularly limited thereto. A transition metal for the transition metal oxide may be selected from the group consisting of zinc (Zn), titanium (Ti), copper (Cu), vanadium (V), manganese (Mn), iron (Fe), and nickel (Ni), an alkali metal may be selected from the group consisting of lithium (Li), sodium (Na) and potassium (K), and an alkaline earth metal may be at least one selected from the group consisting of magnesium (Mg), calcium (Ca), strontium (Sr), and barium (Ba).

A method of forming the first external electrode 131 and the second external electrode 132 does not need to be particularly limited. For example, the first external electrode 131 and the second external electrode 132 may be formed by dipping the ceramic body in a conductive paste including a conductive metal and a glass or may be formed by printing the conductive paste on surfaces of the ceramic body by a screen printing method, a gravure printing method or the like. In addition, the conductive paste may be applied to the surfaces of the ceramic body or a dry film obtained by drying the conductive paste may be transferred onto the ceramic body, but is not limited thereto. Permeation of a plating solution and/or external moisture may be effectively suppressed by increasing a compactness of the external electrodes due to the added glass while maintaining sufficient conductively by the first external electrode 131 and the second external electrode 132 using the conductive paste described above.

Additional external electrodes may be disposed on the first and second external electrodes, respectively. The additional external electrode may be appropriately selected as necessary, and may be a plastic electrode or a resin electrode including a conductive resin.

In addition, in the exemplary embodiment in the present disclosure, the multilayer ceramic electronic component may include plating layers disposed on the first and second external electrodes. The plating layer may be one layer or two or more layers and may be formed by sputtering or electroplating, but is not limited thereto. A material of the plating layer is not particularly limited, and may include nickel (Ni), copper (Cu), tin (Sn), palladium (Pd), platinum (Pt), gold (Au), silver (Ag), tungsten (W), titanium (Ti), or lead (Pb) alone, or alloys thereof.

Figure 4:
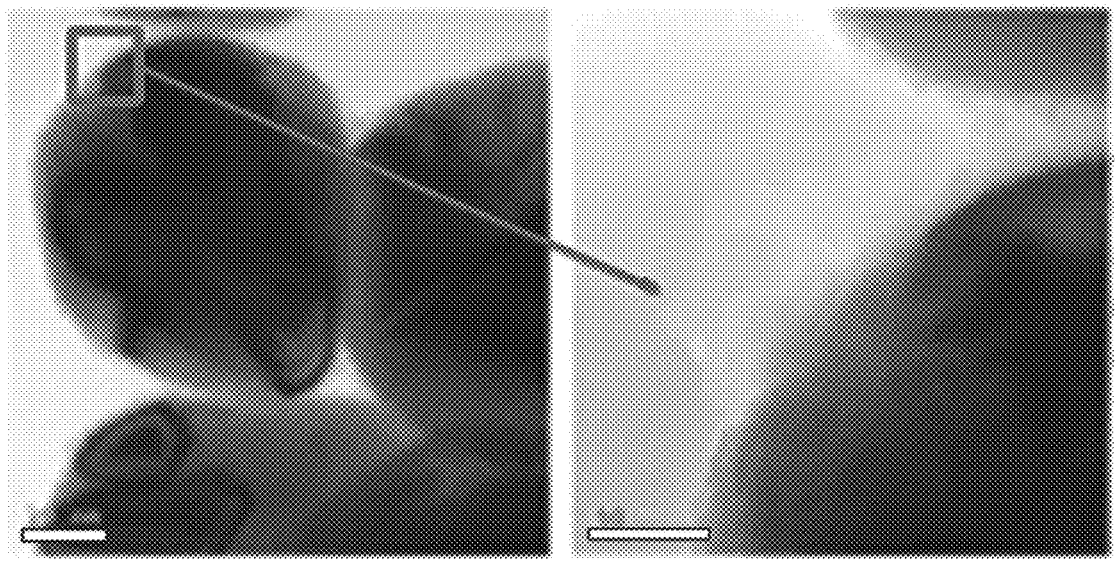
FIG. 4 is an image, captured by a transmission electron microscope (TEM), of a nickel powder particle of which a surface is coated with $SiO_2$ after a heat treatment conducted in the nickel power.

EXPERIMENTAL EXAMPLE $SiO_2$ was attached to the surface of a nickel powder particle (available from Guangbo Group Co., LTD) having an average grain size of 80 nm using 3-aminopropyltriethoxysilane. FIG. 4 is an image, obtained by a transmission electron microscope (TEM), of a nickel powder particle of which a surface was coated with $SiO_2$ after heat treatment of the nickel power. Referring to FIG. 4, a thickness of $SiO_2$ coated on the surface of the nickel powder particle was about 2.9 nm, and it was observed that $SiO_2$ was uniformly coated over the entire surface as may be confirmed.

In Inventive Example, an internal electrode paste was prepared using the prepared nickel powder, and in Comparative Example, an internal electrode paste was prepared using a nickel powder particle of which a surface is not coated with $SiO_2$.

The prepared internal electrode paste was applied to mass-produced chips (temperature characteristics: X5R and capacitance: 2.2 µF) of a 0603 size (length×width: 0.6 mm×0.3 mm) including external electrodes formed on surfaces of a ceramic body in a length direction and available from Samsung Electro-Mechanics to manufacture prototype chips.

Figure 5:
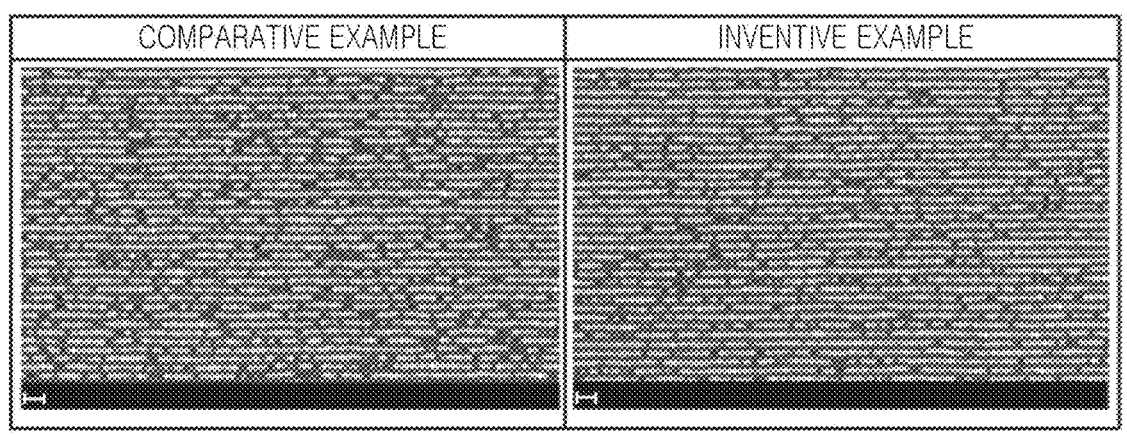
FIG. 5 is images, captured by a scanning electron microscope (SEM) of cross sections of internal electrodes according to Inventive Example and Comparative Example.

FIG. 5 is images, captured by a SEM, of cross-sections of the manufactured prototype chips taken along a plane perpendicular to the length direction. Images of cross sections of internal electrodes according to Inventive Example and Comparative Example were captured using a SEM (JSM-7400F available from Jeol Ltd.), and connectivity of the internal electrodes was then analyzed through an image analysis program (MIA Toolkit V2.0). The connectivity of the internal electrode was measured after a cross section of the internal electrode in a width-thickness direction is trisected. An image of ten layers of the internal electrode at a central portion of each of the trisected portions was captured using the SEM, and a ratio ((total length of internal electrode—length of disconnected internal electrode)/total length of internal electrode) of a length of a connected internal electrode to a total length of the internal electrode in a region of which the image is captured was evaluated as the connectivity. As a result of analyzing the images of FIG. 5, it could be confirmed that the electrode connectivity was improved by about 8% or more in Inventive Example as compared with Comparative Example.

Figure 6:
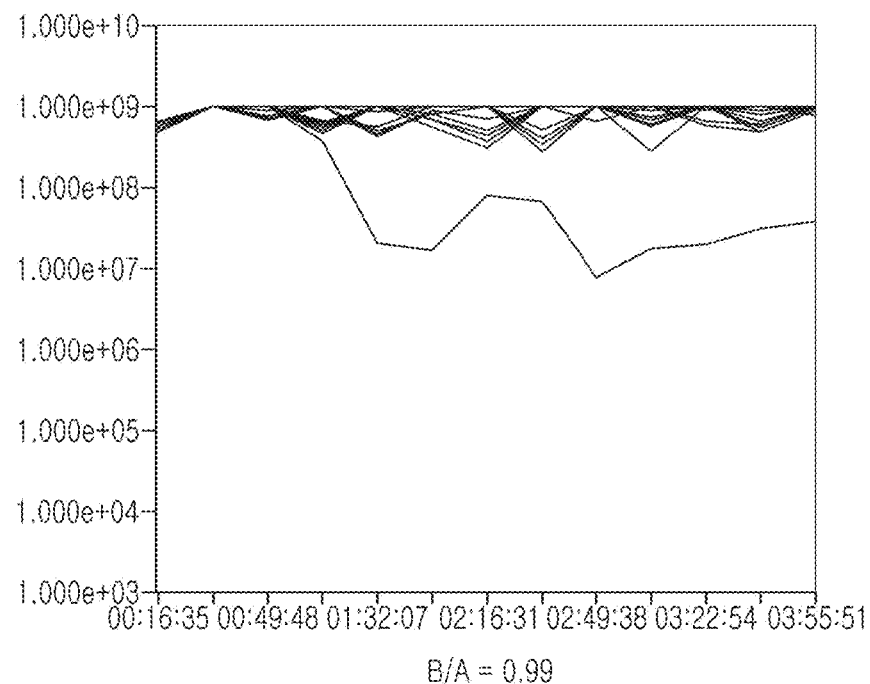
FIGS. 6 though 11 are graphs illustrating moisture resistance reliability test results according to the Inventive Example and the Comparative Example.

FIGS. 6 though 11 are graphs illustrating moisture resistance reliability test results. As a moisture resistance reliability test, a time when insulation resistance was decreased after applying a voltage of 6.3 V to a chip for 12 hours under a condition (8585) of a temperature of 85° C. and a relative humidity of 85% was measured for each of 20 chips.

FIG. 6 is graphs illustrating moisture resistance reliability test results when the ratio (B/A) of the content (B) (wt %) of Si included in the second internal electrode to the content (A) (wt %) of Si included in the dielectric layer is 0.99. Referring to FIG. 6, it was confirmed that insulation resistance decreased after about one hour has elapsed in one sample, but it was confirmed that a large change in insulation resistance was not observed in the other 19 samples.

Figure 7:
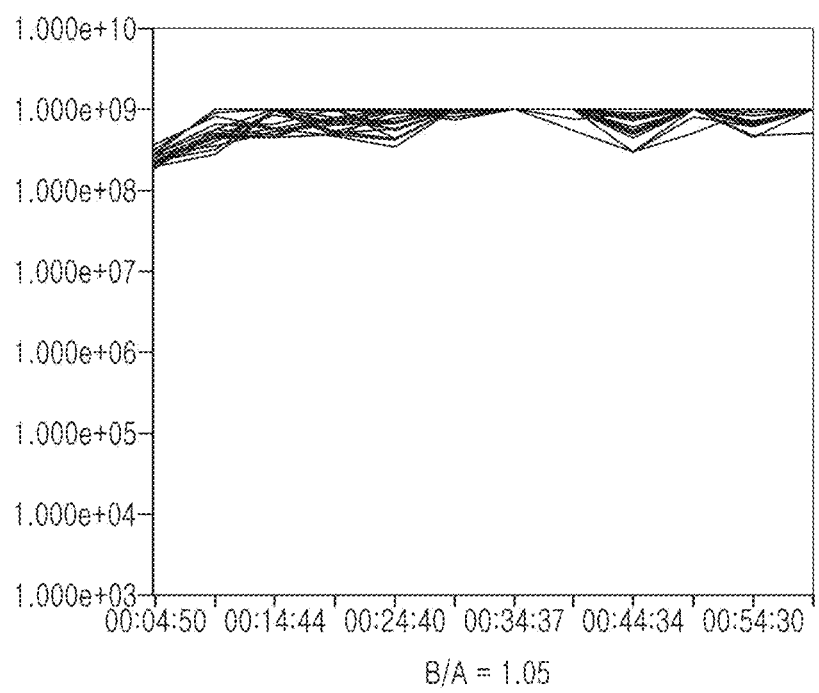
Figure 8:
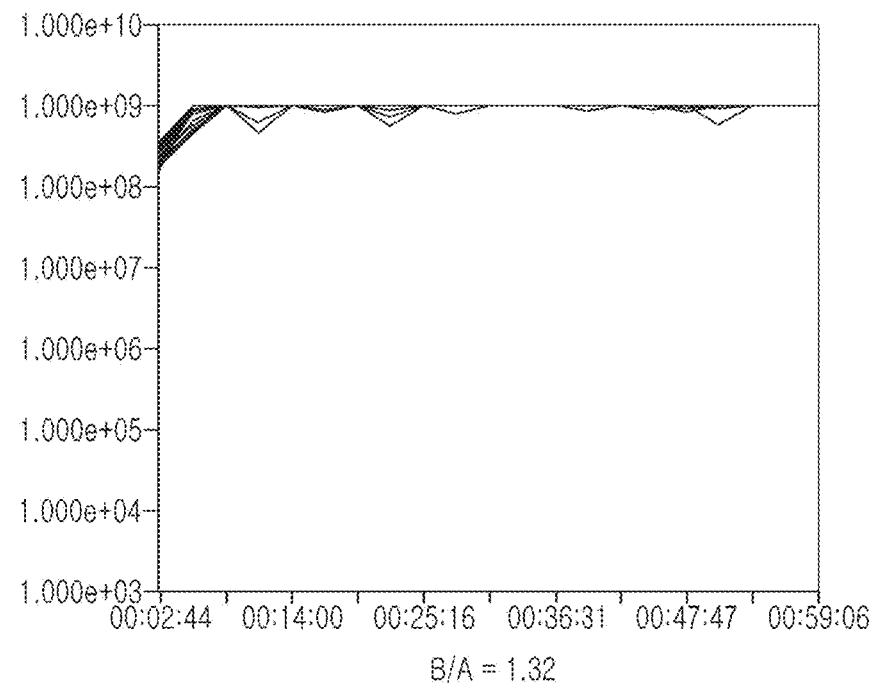
Figure 9:
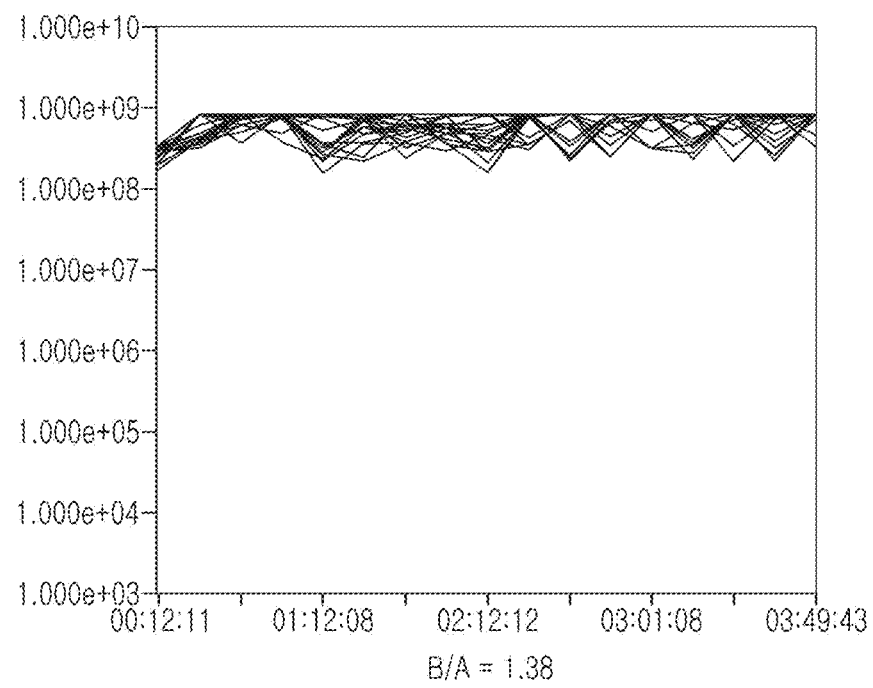

FIGS. 7 through 9 are graphs illustrating moisture resistance reliability test results when the ratio (B/A) of the content (B) (wt %) of Si included in the second internal electrode to the content (A) (wt %) of Si included in the dielectric layer was 1.05, 1.32, and 1.38, respectively. In FIGS. 7 through 9, an X-axis and a Y-axis indicate time and an insulation resistance (IR), respectively. Referring to FIGS. 7 through 9, it was confirmed that a chip in which insulation resistance was decreased was not generated in a section in which the ratio (B/A) of the content (B) (wt %) of Si included in the second internal electrode to the content (A) (wt %) of Si included in the dielectric layer was 1.05 or more and 1.38 or less. This may be a result of improvement of dispersibility of the common material and improvement of connectivity of the internal electrode, and may be assumed to be a result due to the fact that a defect such as delamination does not occur at an interface between the internal electrode and the dielectric layer. That is, it was confirmed that the multilayer ceramic electronic component according to the present disclosure had very excellent internal electrode connectivity and moisture resistance reliability in the section in which the ratio (B/A) of the content (B) (wt %) of Si included in the second internal electrode to the content (A) (wt %) of Si included in the dielectric layer was 1.05 or more and 1.38 or less.

Figure 10:
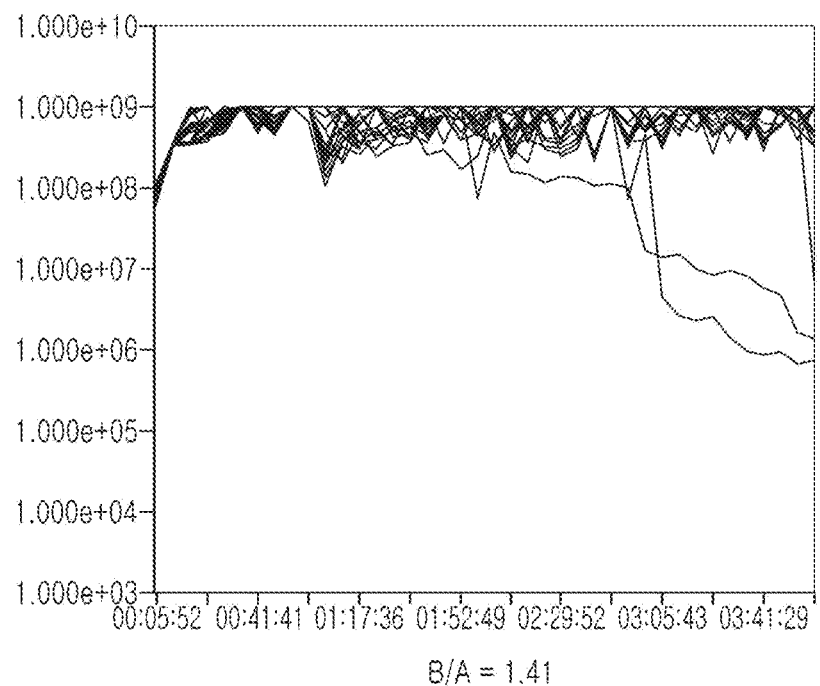

FIG. 10 is graphs illustrating moisture resistance reliability test results when the ratio (B/A) of the content (B) (wt %) of Si included in the second internal electrode to the content (A) (wt %) of Si included in the dielectric layer was 1.41. Referring to FIG. 10, it was confirmed that when the ratio (B/A) of the content (B) (wt %) of Si included in the second internal electrode to the content (A) (wt %) of Si included in the dielectric layer was 1.41, insulation resistance was not decreased in all samples for about two hours or more, and thus, the multilayer ceramic electronic component had good moisture resistance reliability. However, it was confirmed that insulation resistance decreased in some samples after about three hours have elapsed.

Figure 11:
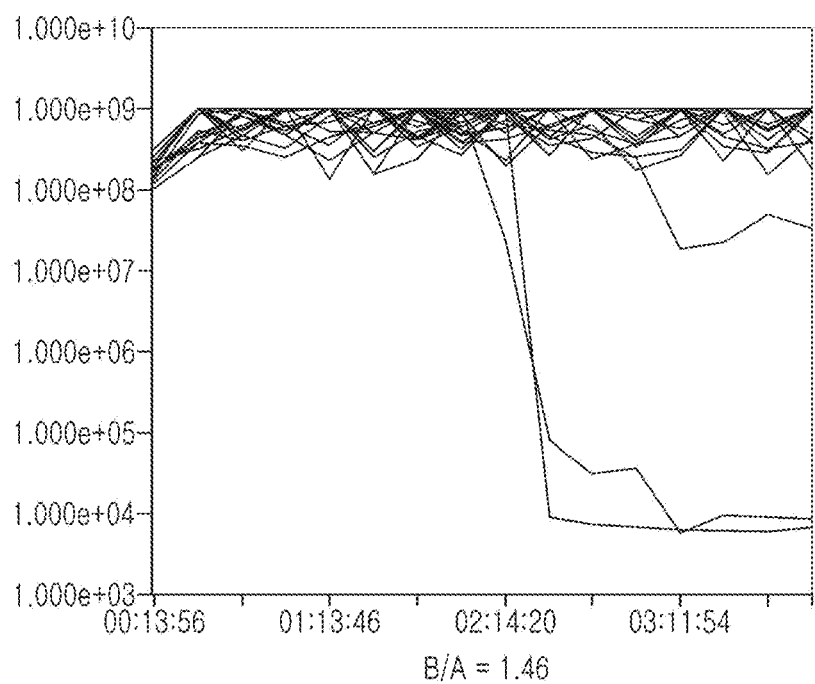

FIG. 11 is graphs illustrating moisture resistance reliability test results when the ratio (B/A) of the content (B) (wt %) of Si included in the second internal electrode to the content (A) (wt %) of Si included in the dielectric layer was 1.46. Referring to FIG. 11, it was confirmed that a sample in which insulation resistance is decreased is generated after about two hours have elapsed when the ratio (B/A) of the content (B) (wt %) of Si included in the second internal electrode to the content (A) (wt %) of Si included in the dielectric layer was 1.46. Therefore, it was confirmed that the ratio (B/A) of the content (B) (wt %) of Si included in the second internal electrode to the content (A) (wt %) of Si included in the dielectric layer needs to be less than 1.46.

Tables 1 and 2 represent results of sintering the prototype chips manufactured in Inventive Example and Comparative Example at different temperatures. Table 1 represents measured results of capacitance, and Table 2 represents measured results of dielectric loss (DF). The capacitance and the dielectric loss were measured using an LCR meter under a condition of 1 kHz and alternating current (AC) 0.5 Vrms.

Referring to Tables 1 and 2, it was confirmed that the capacitance was increased in Inventive Example as compared with Comparative Example at all of different sintering temperatures, and it was confirmed that a capacitance increase rate was about 3.57% or more.

In addition, it was confirmed that the dielectric loss (DF) was increased in the range of about 1.10 or less in Inventive Example as compared with Comparative Example. This may be a result of improvement of the connectivity of the internal electrode as well as the fact that an influence of excessive sintering of a dielectric was not large.

TABLE 1

| Sintering Temperature | Comparative Example | Inventive Example |
|---|---|---|
| 1120° C. | 3.66 | 3.82 |
| 1125° C. | 3.64 | 3.84 |
| 1130° C. | 3.92 | 4.06 |

Measurement Result of Capacitance, Unit: nF, Measurement Condition: 1 kHz and AC 0.5 Vrms

TABLE 2

| Sintering Temperature | Comparative Example | Inventive Example |
|---|---|---|
| 1120° C. | 4.78% | 5.58% |
| 1125° C. | 5.05% | 6.12% |
| 1130° C. | 5.11% | 5.83% |

Measurement Result of DF, Measurement Condition: 1 kHz and AC 0.5 Vrms

As set forth above, according to the exemplary embodiment in the present disclosure, the electrode connectivity of the multilayer ceramic electronic component was improved.

In addition, the capacitance of the multilayer ceramic electronic component was increased.

Further, the electrical characteristics of the multilayer ceramic electronic component was improved.

Further, the moisture resistance reliability of the multilayer ceramic electronic component was improved.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
    a ceramic body including dielectric layers and first and second internal electrodes alternately stacked with respective dielectric layers interposed therebetween; and
    a first external electrode connected to the first internal electrodes and a second external electrode connected to the second internal electrodes,
    wherein the dielectric layer includes silicon (Si),
    each of the first and second internal electrodes includes Si and a conductive metal, and
    a ratio (B/A) of an average content (B) (wt %) of Si included in each of the first and second internal electrodes to an average content (A) (wt %) of Si included in the dielectric layer is 0.99 or more and 1.41 or less.

2. The multilayer ceramic electronic component of claim 1, wherein the average content of Si included in each of the first and second internal electrodes is in a range of 0.1 wt % or more and 2.4 wt % or less.

3. The multilayer ceramic electronic component of claim 1, wherein each of the first and second internal electrodes includes a crystal grain of the conductive metal.

4. The multilayer ceramic electronic component of claim 3, wherein a coating layer having a thickness in a range of 0.5 nm or more and 5.0 nm or less is disposed on a surface of the crystal grain of the conductive metal.

5. The multilayer ceramic electronic component of claim 4, wherein the coating layer includes Si.

6. The multilayer ceramic electronic component of claim 5, wherein Si is in a form of oxide.

7. The multilayer ceramic electronic component of claim 3, wherein Si included in each of the first and second internal electrodes is disposed on a surface of the crystal grain of the conductive metal.

8. The multilayer ceramic electronic component of claim 3, wherein a coating layer having a thickness in a range of 0.6 nm or more and 4.9 nm or less is disposed on a surface of the crystal grain of the conductive metal.

9. The multilayer ceramic electronic component of claim 3, wherein a coating layer having a thickness in a range of 0.7 nm or more and 4.8 nm or less is disposed on a surface of the crystal grain of the conductive metal.

10. The multilayer ceramic electronic component of claim 3, wherein a coating layer having a thickness in a range of 0.8 nm or more and 4.7 nm or less is disposed on a surface of the crystal grain of the conductive metal.

11. The multilayer ceramic electronic component of claim 3, wherein a coating layer having a thickness in a range of 0.9 nm or more and 4.6 nm or less is disposed on a surface of the crystal grain of the conductive metal.

12. The multilayer ceramic electronic component of claim 3, wherein a coating layer having a thickness in a range of 1.0 nm or more and 4.5 nm or less is disposed on a surface of the crystal grain of the conductive metal.

13. The multilayer ceramic electronic component of claim 1, wherein the conductive metal includes one or more selected from the group consisting of nickel (Ni), copper (Cu), tin (Sn), palladium (Pd), platinum (Pt), iron (Fe), gold (Au), silver (Ag), tungsten (W), titanium (Ti), lead (Pb), and alloys thereof.

14. The multilayer ceramic electronic component of claim 1, wherein the electric layer includes a main component represented by $(Ba_{1-x}Ca_x)(Ti_{1-y}(Zr, Sn, Hf)_y)O_3$ (here, $0 \leq x \leq 1$ and $0 \leq y \leq 0.5$).

15. The multilayer ceramic electronic component of claim 1, wherein the dielectric layer includes an accessory component including Si in a range of 2.2 mole parts or more and 5.5 mole parts or less based on 100 mol of a main component.

16. The multilayer ceramic electronic component of claim 1, wherein the ratio (B/A) is 1.01 or more 1.40 or less.

17. The multilayer ceramic electronic component of claim 1, wherein the ratio (B/A) is 1.03 or more 1.39 or less.

18. The multilayer ceramic electronic component of claim 1, wherein the ratio (B/A) is 1.05 or more 1.38 or less.

* * * * *